(12) United States Patent
Kaylor

(10) Patent No.: US 7,238,633 B1
(45) Date of Patent: Jul. 3, 2007

(54) MULTI DENSITY FIBER SEAT BACK

(75) Inventor: Philip S. Kaylor, Claremont, NC (US)

(73) Assignee: L&P Property Management Company, South Gate, CA (US)

( * ) Notice: Subject to any disclaimer, the term of this patent is extended or adjusted under 35 U.S.C. 154(b) by 243 days.

(21) Appl. No.: 10/263,305

(22) Filed: Oct. 1, 2002

Related U.S. Application Data

(60) Provisional application No. 60/326,414, filed on Oct. 1, 2001.

(51) Int. Cl.
*B32B 5/26* (2006.01)
*B32B 5/08* (2006.01)

(52) U.S. Cl. .................... 442/381; 442/218

(58) Field of Classification Search ........... 428/212, 428/213, 218, 296.7, 297.1, 359, 373, 297.4, 428/72, 119, 138, 222, 290, 298, 302, 304.4; 442/364, 374, 381, 392, 138, 224, 218
See application file for complete search history.

(56) References Cited

U.S. PATENT DOCUMENTS

| | | | |
|---|---|---|---|
| 2,500,282 A | 3/1950 | Francis, Jr. ................. 154/101 |
| 3,298,080 A * | 1/1967 | Smith, II ..................... 28/108 |
| 4,668,562 A | 5/1987 | Street ......................... 429/218 |
| 4,753,693 A | 6/1988 | Street ......................... 156/62.8 |
| 4,892,532 A * | 1/1990 | Boman ........................ 604/366 |
| 5,079,074 A | 1/1992 | Steagall et al. ............. 428/218 |
| 5,098,778 A * | 3/1992 | Minnick ...................... 442/224 |
| 5,532,050 A | 7/1996 | Brooks ........................ 428/220 |
| 5,741,380 A | 4/1998 | Hoyle et al. ................ 156/62.6 |
| 5,821,179 A * | 10/1998 | Masaki et al. .............. 442/375 |
| 5,955,386 A * | 9/1999 | Horton ........................ 442/138 |
| 6,063,461 A | 5/2000 | Hoyle et al. ................ 428/34.5 |
| 6,077,378 A * | 6/2000 | Bullard et al. .............. 156/252 |
| 6,506,698 B1 * | 1/2003 | Quantrille et al. .......... 442/361 |
| 6,562,742 B2 * | 5/2003 | Dutkiewicz et al. ........ 442/375 |
| 6,896,669 B2 * | 5/2005 | Krautkramer et al. .................... 604/385.101 |
| 7,022,632 B2 * | 4/2006 | Hatta et al. ................. 442/389 |
| 7,078,089 B2 * | 7/2006 | Ellis et al. .................. 428/138 |

* cited by examiner

*Primary Examiner*—N. Edwards
(74) *Attorney, Agent, or Firm*—Conley Rose, P.C.; Kristin Jordan Harkins; Shannon W. Bates

(57) ABSTRACT

The present invention relates to a multi density fiber seat back for furniture seating systems. The multi density fiber seat back comprises an inner core of a firmer fiber batt and outer fiber batts which are relatively soft. One of the outer softer fiber batts is positioned against the front of the seat back frame and the other outer fiber batt is toward the seating area of the furniture seating system. The outer softer fiber back proximate the seating area imparts a oft plush feel to the touch. The firmer fiber batt core provides back support to one seated on the furniture and ease in raising oneself up from a seated position, as well are providing vertical stability to the multi density fiber back. The outer softer fiber batt proximate the front of the seat back frame provides a sense of reclining as it is compressed.

10 Claims, 7 Drawing Sheets

MULTI DENSITY FIBER SEAT BACK

CROSS-REFERENCE TO RELATED APPLICATIONS

This application is based on and claims priority to U.S. Patent Application Ser. No. 60/326,414, titled Multi Density Fiber Back, filed on Oct. 1, 2001.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to a multi density fiber seat back for furniture such as chairs, sofas, futons and the like. More particularly, the multi density fiber seat back comprises an inner core of relatively high density fiber batt and first and second outer fiber batts of relatively low density. The relatively low density outer fiber batts are resiliently compressible to provide a soft plush feel to the touch and a sense of reclining as the fiber batts are compressed. The core of relatively high density fiber batt provides back support to one seated on the furniture and ease in raising oneself up from a seated position, as well as providing vertical stability to the multi density fiber seat back.

BACKGROUND OF THE INVENTION

Traditional cushion seat backs for furniture generally comprise loose fiberfill, nonwoven fiber batts, and foams, among other materials, for achieving a range of comfort, loft and durability. The material traditionally used in furniture back cushions in which a soft plush feel is desired, is blown loose fiberfill. While loose fiberfill provides a soft plush feel, the fibers are not bonded together and thus have a tendency to settle toward the bottom of the cushion seat back. Baffles can be constructed in the seat back in which the loose fiberfill is blown in an effort to minimize the settling effect; however, the undesirable settling effect cannot totally be eliminated.

Nonwoven fiber batts are also used as cushions in furniture backs. The fiber batts are constructed of synthetic or natural fibers. The fibers are inherently lightweight and therefore relatively easy to ship, store and manipulate during fabrication. Synthetic fibers are generally not moisture absorbent and as a result, products made from synthetic fibers can be maintained in a hygienic condition. When subjected to open flame, many of the synthetic fibers tend to melt and drip rather than burn. While some synthetic fibers may give off toxic fumes, the escape of such fumes can be avoided or minimized by encapsulating the batt in a fire retardant or relatively air impermeable casing. Traditional fiber batts maintain their comfort characteristics over time and have desired comfort and height characteristics.

Foam materials have also been used in the construction of furniture seat backs. While foam imparts cushioning and resilience to the seat back, it is characteristically firm and thus suitable for applications where stronger back support is desirable to one using the furniture.

SUMMARY OF THE INVENTION

The multi density fiber seat back comprises a core of relatively high density fiber batt and outer fiber batts having relatively lower densities. A denser batt is relatively firmer while a less dense batt is relatively softer. As a result, the fiber batt core is a firmer fiber batt and the outer fiber batts are softer. In a furniture seating system, the multi density fiber seat back is placed against the seat back frame of a furniture back, with one outer fiber batt toward the seat back frame and the other outer fiber batt toward the seating area of the furniture. Upholstery or other material covers the multi density fiber seat back to provide a decorative furniture seat back. The softer outer fiber batt proximate the seating area is relatively easy to compress and imparts a soft plush feel to the touch. The firmer core of fiber batt provides back support to one sitting on the furniture and also provide ease in raising oneself up from a seated position. The softer outer fiber batt proximate the seat back frame provides a sense of reclining when sufficient compression is applied to the multi density fiber back to compress the firmer fiber batt core.

The thickness of each of the fiber batts and the multi density fiber seat back can be any dimension suitable for the desired characteristics of a furniture seat back. Factors to consider in designing suitable thicknesses include without limitation, softness or plushness, back support and a sense of reclining, and the overall thickness desired for the furniture seat back. For a furniture back where softness to the touch and a sense of plushness are desirable, a relatively thick outer fiber back facing the seating area would be desirable. For a furniture back where firmer back support is desirable, a relatively thick fiber batt core would be appropriate. For furniture backs where a sense is reclining is desirable, a relatively thick outer fiber batt proximate the seat back frame is suitable.

Each of the fiber batts comprises nonwoven carrier fibers which can be a blend of various types of fibers, including synthetic and natural fibers. In general, a different proportion or selection of fibers for the fiber batts can result in their different densities. The fiber batts can further comprise low melting temperature binder fibers should a thermal bonding process be used in their construction. The fibers which define each of the fiber batts of the multi density fiber seat back are formed into a web for construction into each of the nonwoven batts.

The webs are then thermally processed into fiber batts. The thermal process includes heating the fiber web structure at a temperature sufficient to melt the low melting temperature fibers but low enough to avoid melting the other fibers of the web. The fiber web structure is compressed and then cooled to form the fiber batt. Each web can be thermally processed separately into a batt, or alternatively, the webs for two or all of the fiber batts can be overlaid and thermally processed simultaneously to form the multi density fiber seat back. If each web is processed separately into a fiber batt, the core fiber batt and the outer fiber batts are overlaid and bonded or laminated together to form the multi density fiber seat back. Bonding or lamination can be achieved with glue, adhesives, resins or other bonding agents which can be sprayed, painted or otherwise applied to the batts. Another suitable bonding method includes thermal reprocessing of the batts. Other methods for forming the multi density fiber seat back include overlaying a web for the fiber batt core with a web for one of the outer fiber batts and thermally processing them simultaneously. This fiber web structure could then be bonded or laminated to a similar web structure with the core fiber batts proximate one another. Alternatively, a second outer fiber batt formed from a web of fibers could be bonded or laminated to the fiber batt core opposite the first outer fiber batt to form the multi density fiber seat back.

The fiber web structure can also be processed into a fiber batt using resin rather than low melting temperature binder fibers. The fiber web structure is saturated with a heat curable resin. Heat is applied at a temperature sufficient to cure the resin and fuse the fibers to form a batt having a density and thickness substantially the same as during the heating step. The fiber batts are overlaid and bonded or laminated together to form the multi density fiber seat back.

BRIEF DESCRIPTION OF THE DRAWINGS

For a more complete understanding of the present invention, and for further details and advantages thereof, reference is now made to the following Detailed Description of the Drawings taken in conjunction with the accompanying drawings, in which.

DETAILED DESCRIPTION OF THE DRAWINGS

Figure 1:
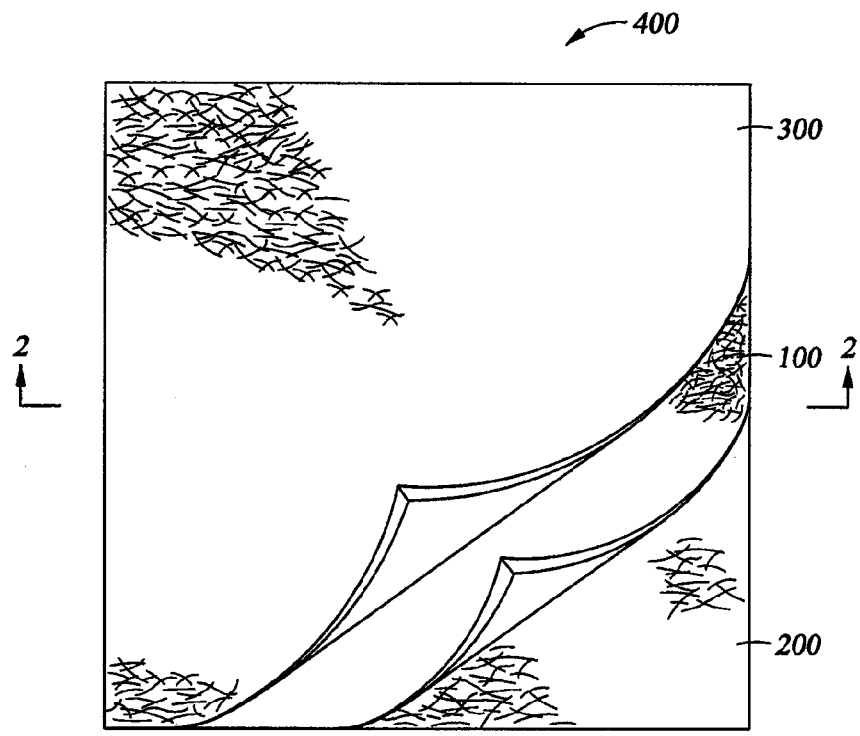
FIG. 1 provides a partial perspective sectional view with layers removed for clarity, of a multi density fiber seat back.
Figure 2:
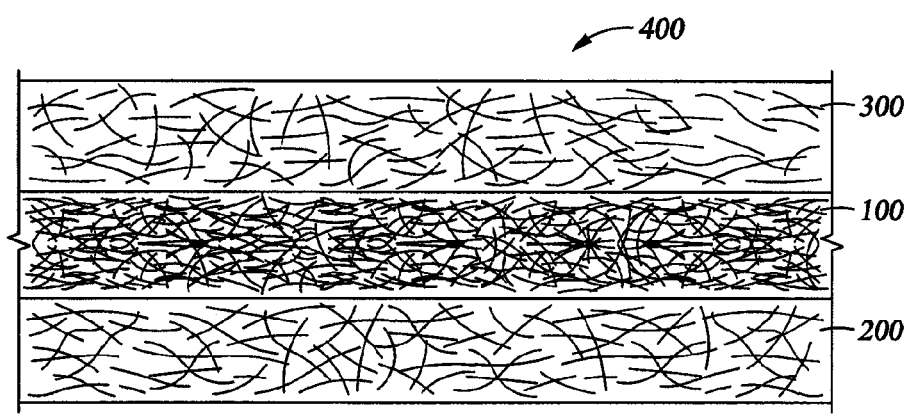
FIG. 2 provides a side view of a multi density fiber seat back.

Referring to FIGS. 1 and 2, a multi density fiber seat back 400 comprises an inner core of a relatively high density fiber batt 100 and first and second outer fiber batts having relatively low densities 200, 300. The density of outer fiber batts 200, 300 can be the same or different, so long as each of their relative densities is less than that of the core fiber batt 100. Batt density is traditionally measured in ounces per square foot. By way of examples and not as a limitation to the scope of the invention, fiber batt densities can include less than one (1) ounce per square foot to over five (5) ounces per square foot. In addition, suitable batt densities for the firmer core fiber batt 100 and at least one of the softer fiber batts 200, 300 would include without limitation, 3.50 and 1.50 ounces per square foot, respectively; 3.15 and 0.85 ounces per square foot, respectively; 5.00 and 1.00 ounces per square foot, respectively; and 2.30 and 0.70 ounces per square foot, respectively. The foregoing examples are illustrations of suitable densities and not limitations to the scope of the invention. The scope includes density combinations which provide relatively high densities for the firmer core fiber batt and relatively low densities for the softer outer fiber batts. In general, a denser batt is relatively firm, while a less dense batt is relatively soft. As a result, the inner fiber batt core 100 may be referred to as the "firmer" fiber batt and the outer fiber batts 200, 300 may be referred to as "softer" fiber batts. The firmer fiber batt core 100 and the softer outer fiber batts 200, 300 of the multi density fiber seat back 400 are compressible and rebound when compression is released. As a result of the relative firmness of the fiber batt core 100, it is relatively less compressible than the softer outer fiber batts 200, 300.

Figure 3A:
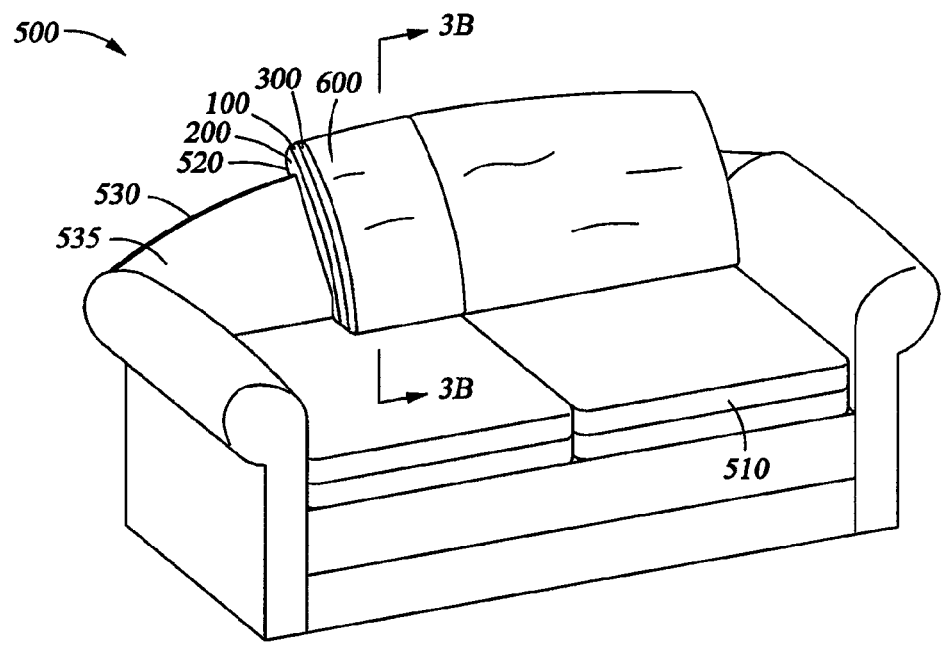
FIG. 3A provides a partial perspective view of a furniture seating system with a multi density fiber seat back with layers removed for clarity.
Figure 3B:
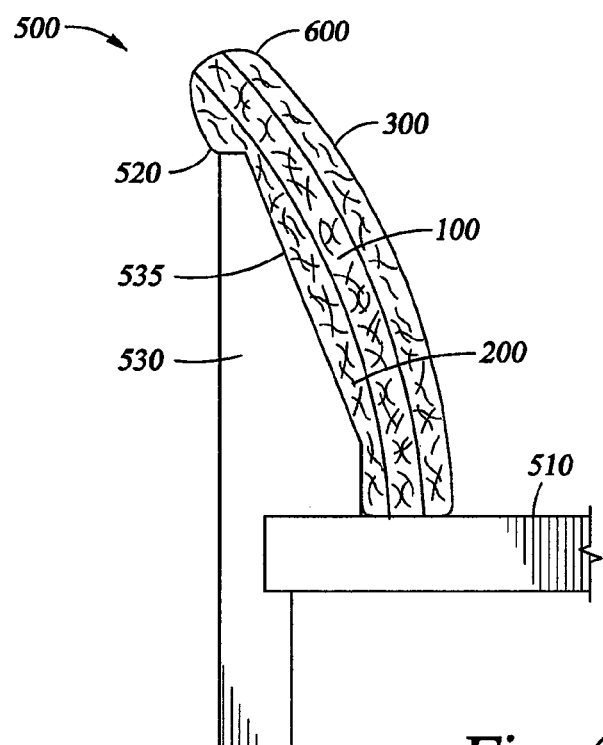
FIG. 3B provides a side view of a furniture seating system with a multi density fiber seat back.

Referring to FIGS. 3A and 3B, a partial perspective view and side view of a furniture seating system with a multi density fiber seat back is shown with layers removed for clarity. While a sofa is depicted, the discussion applies to any furniture having a seating system with a back such as for example a chair or a futon. The multi density fiber seat back 400 of the present invention can be used with any type of furniture seating system and is not limited to that shown in the drawings. Conventional furniture seating system 500 generally comprises seating area 510 and furniture seat back 520. Furniture seat back 520 generally comprises seat back frame 530 having front 535 which is facing toward seating area 510. The seat back frame 530 can be constructed of wire, metal, plastic, wood or any other material which is traditionally used in the construction of a furniture back. In addition, frame 530 can be solid, latticed, grid or any other conventional design. In a furniture seating system, multi density fiber seat back 400 is placed against seat back frame 530 with outer fiber batt 200 facing toward the front 535 of the seat back frame 530 and outer fiber batt 300 facing toward seating area 510. Upholstery 600 or other suitable material covers the fiber batts 100, 200, 300 to provide a decorative multi density fiber seat back 400. The softer outer fiber batt 300 proximate the seating area 510 is resiliently compressible and imparts a soft plush feel to the touch. The firmer fiber batt core 100 which is resiliently compressible to a lesser degree than the softer outer fiber batt 300, provides back support to one sitting on the furniture and ease in raising oneself up from a seated position. In addition, the firmer fiber batt core 100 provides vertical stability to the multi density fiber seat back 400. The softer outer fiber batt 200 proximate the front 535 of seat back frame 530 is also resiliently compressible and provides a sense of reclining when sufficient compression is applied to the multi density fiber back 400 to compress the relatively firmer fiber batt core 100, which compression would also compress the softer outer fiber batt 200 behind the fiber batt core 100. As a result, the multi density fiber seat back 400 provides a support system for a furniture back incorporating a soft plush feel to the touch, a firmer back support and ease in raising oneself up from a seated position, and a sense of reclining.

The thickness of each of the fiber batts 100, 200, 300 and of the multi density fiber seat back 400 can be any dimension suitable to achieve the desired characteristics of a furniture seating system. Factors to consider in selecting suitable thicknesses include without limitation, the softness or plushness of the furniture seating system, the back support required for the furniture seating system, a desired sense of reclining and the overall desired thickness for the multi density seat back. For a furniture seating system where softness to the touch and a sense of plushness are desirable features, a relatively thicker outer fiber batt 300 proximate the seating area 510 is suitable. For furniture seating systems where firmer back support is desired, a relatively thicker fiber batt core 100 would be appropriate. For furniture seating systems where a heightened sense of reclining is desirable, a relatively thicker outer fiber batt 200 proximate the front 535 of seat back frame 530 is suitable. By way of example and not by way of limitation, the thickness of the firmer fiber batt core 100 which forms the interior of the multi density fiber seat back 400, could range anywhere from less than one (1) inch for seat backs which provide relatively little back support, to thicknesses of approximately twelve (12) inches which would provide relatively firm back support. Other suitable ranges for fiber batt core 100 would include thicknesses of one (1) inch to six (6) inches and also a thickness of approximately four (4) inches. Again by way of example and not as a limitation, the thickness of each of the relatively low density fiber batts 200, 300 could range anywhere from two (2) inches to eight (8) inches to provide, respectively, an increasing sense of reclining for the fiber batt 200 proximate the front 535 of the seat back frame 530 and softness for the fiber batt 300 proximate the seating area 510. In addition, a suitable thickness for each of the fiber batts 200, 300 can be approximately four (4) inches. Outer batts 200, 300 can be the same thickness or can be different as appropriate for the desire furniture seating system application. The above ranges of absolute thicknesses are provided by way of example and not as limitations to the scope of the present invention. As used herein, the ratio of softness to firmness for a multi density fiber seat back 400 is the ratio of the combined thicknesses of the softer outer fiber batts 200, 300 to the thickness of the firmer fiber batt core 100. Accordingly, a multi density fiber seat back 400 having approximately a four (4) inch thick fiber batt core 100 and outer fiber batts 200 and 300 each having approximately a four (4) inch thickness, would have a total thickness of approximately twelve (12) inches and a ratio of softness to firmness of 2 to 1, as that ratio is used herein. Other examples of suitable softness to firmness ratios for the multi density fiber seat back 400 include without limitation, 1 to 1; 2 to 1; 3 to 1; 4; to 1; 8 to 1; and 1 to 2; 2 to 3 and 2 to 5.

Each of the fiber batts 100, 200, 300 is comprised of nonwoven carrier fibers which can be a blend of various types of fibers, including both synthetic and natural fibers. Examples of suitable synthetic carrier fibers include thermoplastic polymer fibers such as polyester, nylon and polypropylene. Suitable natural carrier fibers would include without limitation, cotton, wool, camel, llama and cashmere. Of course, other synthetic and natural fibers can be used depending upon the precise processing limitations imposed and the nature of the batts which is desired for a furniture seating system. In general, the different densities of the fiber batts 100, 200, 300 can result from different proportions or selections of fibers which form the batts. The fiber batts 100, 200, 300 can further comprise low melt binder fibers, should thermal bonding processes be used for bonding adjacent fibers together. The density and thickness of the fiber batts 100, 200, 300 are determined by, among other factors, the process of compressing the batts as they are cooled in thermal bonding processes, or the heating process which cures the resin and fixes the fiber batts in the compressed state in resin bonding processes.

Turning to the processes which in general are used to bond the fibers of the fiber batts 100, 200, 300 together, those discussed herein include a thermal bonding process and a resin saturated curing process. Other methods may be suitable for bonding non-woven fibers together to form the fiber batts for use in a multi density fiber seat back 400. For example, needle punching, hydro entangling and mechanical bonds are also suitable.

Figure 4A:
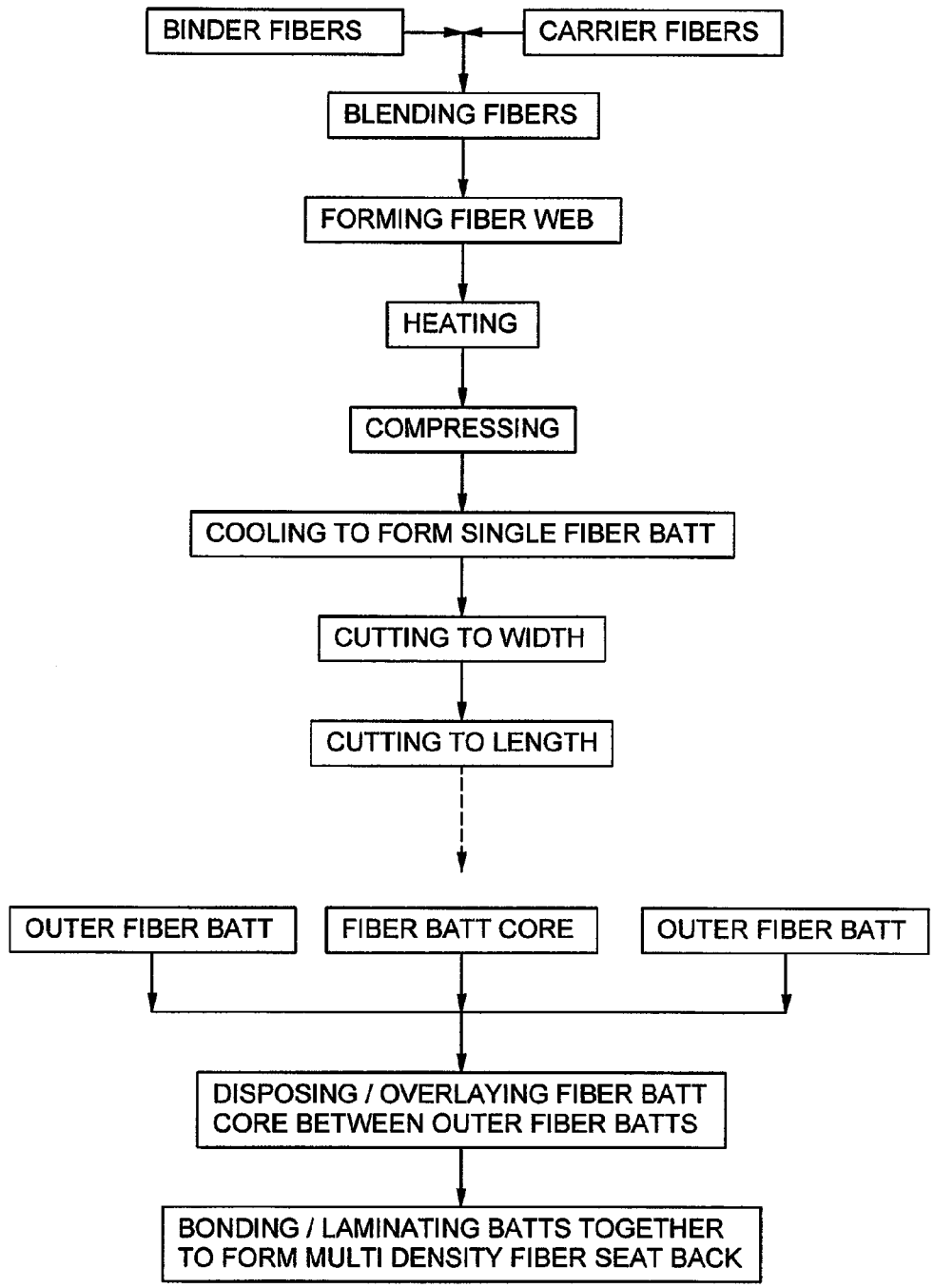
FIG. 4A provides a schematic illustration reflecting a process for producing fiber batts for a multi density fiber seat back FIG. 4B provides a schematic illustration reflecting another process for producing fiber batts for a multi density fiber seat back.
Figure 4B:
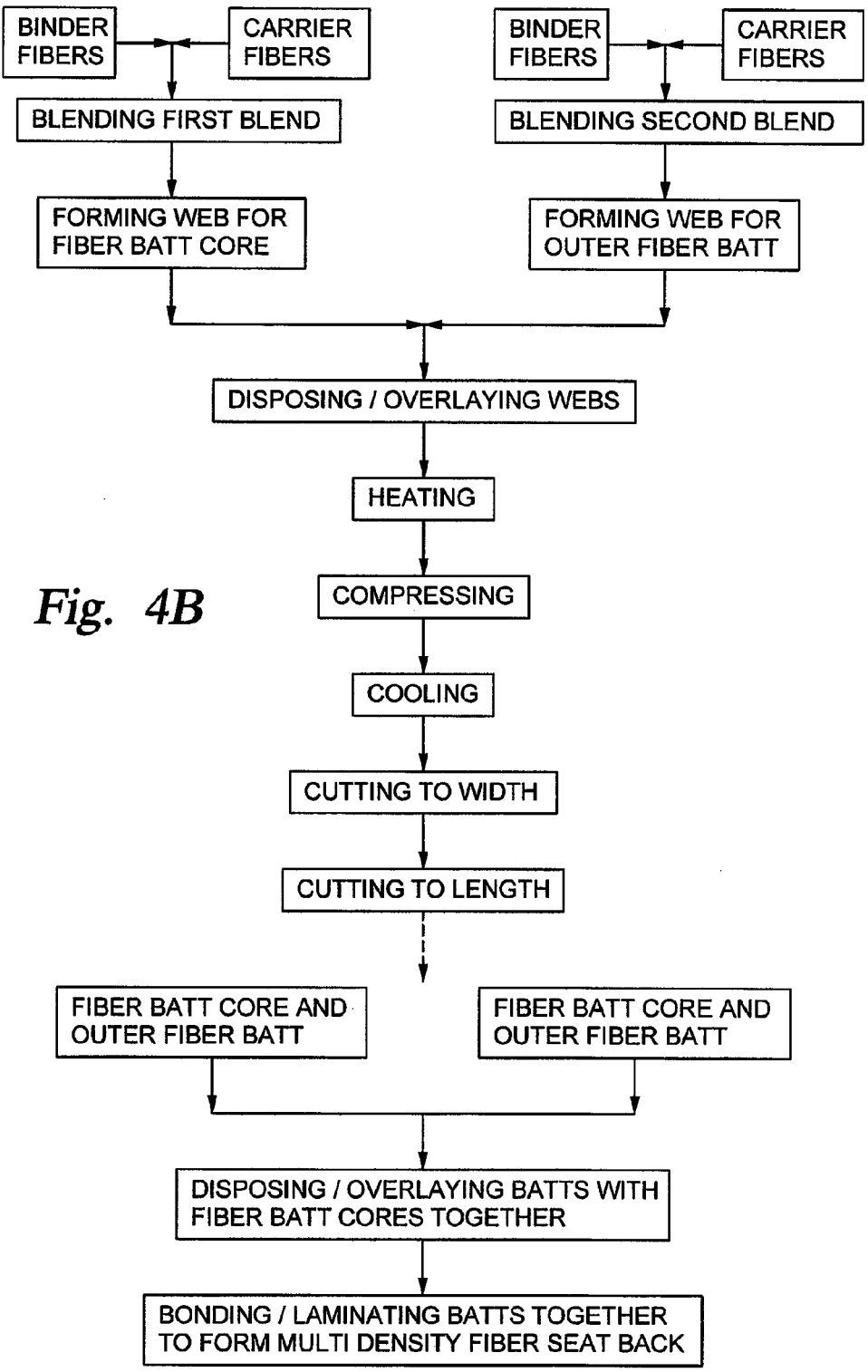

A thermal bonding process for the fiber batts is representatively and schematically illustrated in FIGS. 4A and 4B. The fiber batts 100, 200, 300 may suitably be formed in conventional picking, opening and blending lines of the type used to open and blend fibers. The method of FIG. 4A illustrates that each web for fiber batts 100, 200, 300 can be thermally processed separately into its batt and the batts 100, 200, 300 are then bonded or laminated together to form the multi density fiber seat back 400. Alternatively, FIG. 4B illustrates that the webs for fiber batt core 100 and one of outer fiber batts 200 or 300, upon formation, are overlaid for simultaneous thermal bonding. The combined batt structure can be overlaid with a similar structure, the fiber batt cores 100 facing one another, for bonding or lamination therebetween. Alternatively (not shown), the combined batt structure comprising the fiber batt core 100 and outer fiber batt 200 or 300 could be overlaid with the other outer fiber batt 300 or 200, the fiber batt core 100 positioned between the outer fiber batts 200, 300, for bonding or lamination.

Referring to FIGS. 4A and 4B, each of the fiber batts 100, 200, 300 is formed from a homogenous blend of fibers, some of which are binder fibers and some of which are carrier fibers. The homogeneous blends of carrier and binder fibers for each of the fiber batts 100, 200, 300, can be of different proportions or selections of fibers to achieve the different batt densities. In addition, the densities of the outer fiber batts 200, 300 can be the same or different, so long as their densities are lower in relation to the density of the fiber batt core 100. The carrier fibers can be a blend of various types of fibers, including both synthetic and natural fibers. Examples of suitable natural carrier fibers include without limitation, cotton, wool, camel, llama and cashmere. Suitable synthetic fibers include without limitation thermoplastic polymer fibers such as polyester, nylon and polypropylene. The blend of carrier fibers may include fibers having varying diameters and deniers, and may be hollow, solid or crimped. In addition, the blend of carrier fibers can include dry fibers or slick fibers. In general, a dry fiber is one which is coated with a surface finish which lubricates the fiber for processing purposes but does not impart a slippery feel or hand to the fiber. A slick fiber is one which is coated with a finish which imparts a slippery or slick feel or hand to the fiber. Blending of different types of carrier fibers create dead air spaces which contribute to the resiliency of the fiber layer. Other suitable carrier fibers can be used depending upon the precise processing limitations imposed and the characteristics of the fiber batts 100, 200, 300 and resulting multi density fiber seat back 400 which are desired, and as a result, are within the scope of this invention.

The binder fiber for the fiber batts 100, 200, 300 has a relatively low predetermined melting temperature as compared with the carrier fibers. As used herein, however, the term melting does not necessarily refer only to the actual transformation of the solid polyester binder fibers into liquid form. Rather, it refers to a gradual transformation of the fibers or, in the case of a bicomponent sheath/core fiber, the sheath of the fiber, over a range of temperatures within which the polyester becomes sufficiently soft and tacky to cling to other fibers within which it comes in contact, including other binder fibers having its same characteristics and, as described above, adjacent carrier fibers which have a higher melting temperature. It is an inherent characteristic of thermoplastic fibers such as polyester that they become sticky and tacky when melted, as that term is used herein.

For purposes of illustrating the types of suitable binder fibers, and not by way of limitation, the binder fibers can be KoSa Type 254 Celbond® which is a bicomponent fiber with a polyester core and a copolyester sheath. The sheath component melting temperature is approximately 230° F. (110° C.) The binder fibers, alternatively, can be a polyester copolymer rather than a bicomponent fiber.

While the homogeneous blend of non-woven carrier and binder fibers for fiber batts 100, 200, 300 can be any of a number of suitable fiber blends, for purposes of illustration, each blend is comprised of binder fibers in an amount sufficient for binding the fibers of the blend together upon application of heat at a temperature suitable to melt the binder fibers but not the carrier fibers. In general, a higher percentage of low melting temperature fibers would create a fiber batt having a relatively high density compared to the density of a fiber batt having a lower percentage of low melting temperature fibers. A higher percentage of low melting temperature fibers in a fiber batt generally causes more binding of the fibers together when the low melting temperature fibers melt, thus resulting in a relatively high density fiber batt. In addition, a relatively high density fiber batt would generally result from a blend having a larger percentage of dry fibers while a fiber batt having a smaller percentage of dry fibers would have a relatively low density. In an example, the relatively high density fiber batt core 100 comprises a blend of binder fibers in the range of approximately 10 percent to 50 percent by volume and carrier fibers in the range of approximately 85 percent to 50 percent. In another example, the binder fibers in a relatively high density fiber batt 100 could be present in the range of approximately 10 percent to 20 percent by volume and carrier fibers in the range of approximately 90 percent to 80 percent by volume. The blend for the relatively high density fiber batt 100 could also comprise binder fibers and carrier fibers in the range of approximately 10 percent to 15 percent and approximately 90 percent to 85 percent by volume, respectively. Suitable blends for relatively low density outer fiber batts 200, 300 include without limitation, 5 percent to 50 percent of binder fibers and 95 percent to 50 percent of carrier fibers. Another suitable blends for outer fiber batts 200, 300 would include approximately 5 percent to 25 percent by volume of binder fibers and 75 percent to 95 percent by volume of carrier fibers. The blend for the relatively low density outer fiber batts could also include approximately 8 percent by volume of binder fibers and 92 percent by volume of carrier fibers. Other blends for fiber batts 100, 200, 300 would be suitable so long as the relative densities of the outer fiber batts 200, 300 are less than the relative density of the fiber batt core 100. Blends for the fiber batts 100, 200, 300 having percentages of binder and carrier fibers not specifically mentioned herein may also be suitable and as a result are within the scope of the invention.

Figure 5:
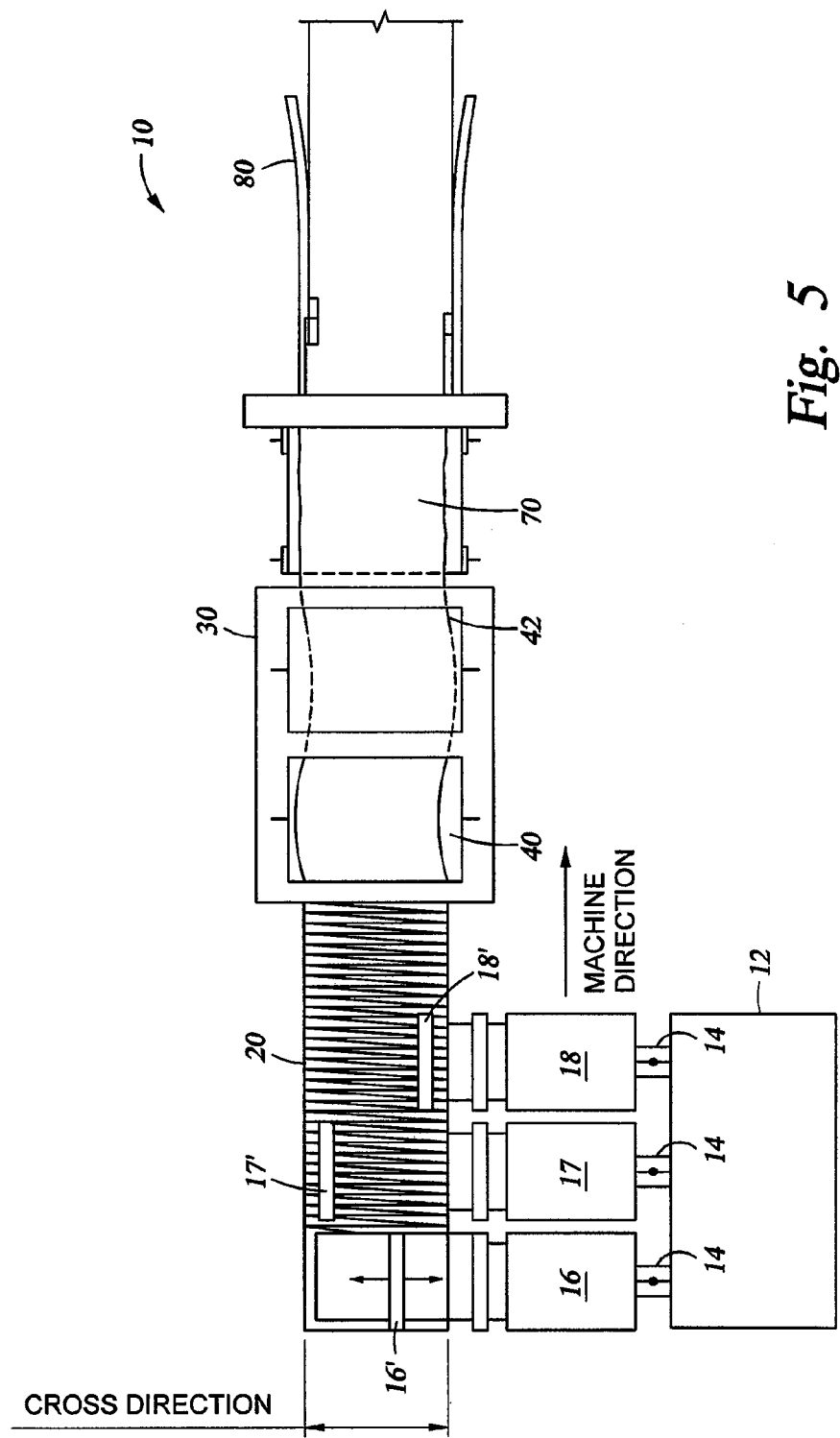
FIG. 5 provides a schematic top plan view of the processing line for forming a fiber batt for a multi density fiber seat back FIG. 6A provides a schematic side view of a thermal bonding apparatus for a fiber batt for a multi density fiber seat back.

Referring to FIG. 5, a schematic top plan view of the general processing line 10 for forming a fiber batt of the present invention is illustrated. As discussed above in reference to FIGS. 4A and 4B, fibers for each of the fiber batts 100, 200, 300 are blended in a fiber blender 12 and conveyed by conveyor pipes 14 to a web forming machine or, in this example, three machines 16, 17, 18. A suitable web forming apparatus is a garnett machine. An air laying machine, known in the trade as a Rando webber, or any other apparatus for forming a web structure is suitable. Garnett machines 16, 17, 18 card the blended fibers into a non-woven web having a desired width and deliver the web to cross-lappers 16', 17', 18' to cross-lap the web onto a slat conveyor 20 which is moving in the machine direction. Cross-lappers 16', 17' 18' reciprocate back and forth in the cross direction from one side of conveyor 20 to the other side to form each of the webs for fiber batts 100, 200, 300 having multiple thicknesses in a progressive overlapping relationship. The number of layers which make up each of the fiber webs is determined by the speed of the conveyor 20 in relation to the speed at which successive layers of the web are layered on top of each other and the number of cross-lappers 16', 17', 18'. Thus, the number of single layers which make up each of the fiber webs can be increased by slowing the relative speed of the conveyor 20 in relation to the speed at which cross layers are layered, by increasing the number of cross-lappers 16', 17' 18' or both. Conversely, a fewer number of single layers can be achieved by increasing the relative speed of conveyor 20 to the speed of laying the cross layers, by decreasing the number of cross-lappers 16', 17', 18' or both.

Referring back to FIGS. 4A and 4B, the fiber web for each of the fiber batts 100, 200, 300 is formed from a blend of fibers. Each web could be heated, compressed and cooled separately to form a single fiber batt 100, 200, 300. Alternatively, the webs can be overlaid, with the fiber web for the fiber batt core between the webs for the outer fiber batts. The webs are then simultaneously heated, compressed and cooled to form the multi density fiber seat back 400. Alternatively, the fiber web for the fiber batt core 100 could be overlaid with a fiber web for an outer fiber batt 200 or 300, and then simultaneously heated, compressed and cooled. As used herein, fiber web structure refers to a single fiber web or multiple fiber webs. Heat is applied to the fiber web structure to melt the low melting temperature fibers. While there are a variety of thermal bonding methods which are suitable, one such method comprises holding the fiber web structure by vacuum pressure applied through perforations of first and second counter-rotating drums and heating the fiber web structure so that the relatively low melting temperature binder fibers soften or melt to the extent necessary to fuse adjacent low melt binder fibers together and to adjacent carrier fibers. Alternatively, the fiber web structure can move through an oven by substantially parallel perforated or mesh wire aprons to melt the low temperature binder fibers.

Figure 6A:
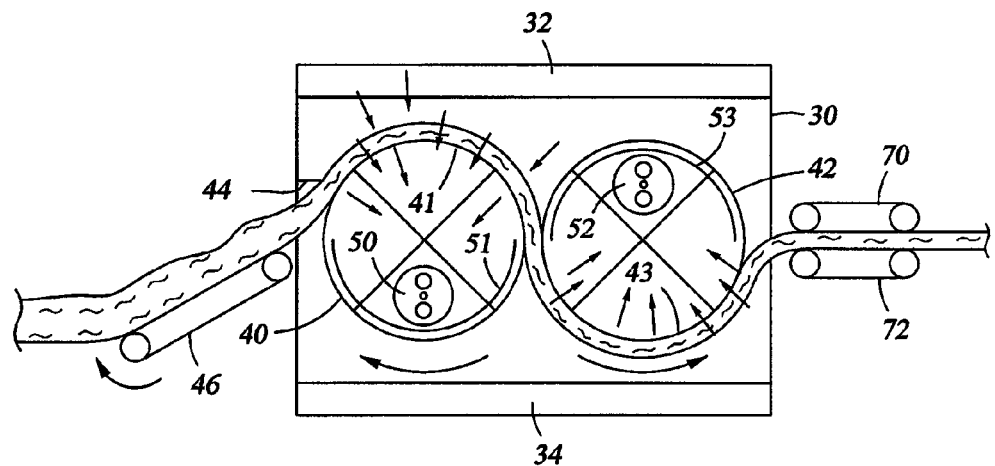
FIG. 6B provides a schematic side view of another thermal bonding apparatus for a fiber batt for a multi density fiber seat back.

Referring to FIGS. 5 and 6A, the vacuum pressure method generally comprises using counter-rotating drums 40, 42 having perforations 41, 43, respectively, which are positioned in a central portion of a housing 30. Housing 30 also comprises an air circulation chamber 32 and a furnace 34 in an upper portion and a lower portion, respectively, thereof. Drum 40 is positioned adjacent an inlet 44 though which the fiber web structure is fed. The fiber web structure is delivered from the blending and web forming processes described herein by means of an infeed apron 46. A suction fan 50 is positioned in communication with the interior of drum 40. The lower portion of the circumference of drum 40 is shielded by a baffle 51 positioned inside drum 40 so that the suction-creating air flow is forced to enter drum 40 through perforations 41 which are proximate the upper portion of drum 40 as it rotates.

Drum 42 is downstream from drum 40 in housing 30. Drums 40, 42 can be mounted for lateral sliding movement relative to one another to facilitate adjustment for a wide range of thicknesses for the fiber web structure (not shown). The adjustment is made according to the thickness of the fiber web structure being processed so that the distance between adjacent surfaces of drum 40, 42 closely approximates the thickness of the web in its compressed state as it is transferred from drum 40 to drum 42. Assuming a fiber web structure thickness of four (4) inches in its compressed state on drum 40, the distance between adjacent surfaces of drums 40, 42 in would be approximately four (4) inches. To manufacture a web having a thickness of two (2) inches, the distance between drums 40, 42 would need to be approximately two (2) inches. Drum 42 includes a suction fan 52 which is positioned in communication with the interior of drum 42. The upper portion of the circumference of drum 42 is shielded by a baffle 53 positioned inside drum 42 so that the suction-creating air flow is forced to enter drum 42 through perforations 43 which are proximate the lower portion of drum 42 as it rotates.

The fiber web structure is held in vacuum pressure as it moves from the upper portion of rotating drum 40 to the lower portion of counter rotating drum 42. Furnace 34 heats the air in housing 30 as it flows from perforations 41, 43 to the interior of drums 40, 42, respectively, to soften or melt the relatively low melting temperature binder fibers to the extent necessary to fuse adjacent low melt binder fibers together and to adjacent carrier fibers. The temperature of the heated air is low enough to avoid melting the other fibers of the blend. The plastic memory of the softened binder fibers is released in their compressed configuration and the fibers fuse to themselves and to the other web fibers to form a batt having interconnected and fused fibers. Variations in vacuum and temperature in drums 40, 42 can create the density differentials of the resulting core fiber batt 100 and the outer fiber batts 200, 300 of the multi density fiber seat back 400. For example, lower vacuum and lower temperature settings in the counter rotating drums 40, 42 would result in a fiber batt having relatively low density, whereas high vacuum and temperature settings would achieve a higher density fiber batt. In addition, fiber web structures comprising a fiber batt core 100 overlaid with a single outer fiber batt 200 or 300, the firmer fiber batt core 100 can be placed adjacent the infeed apron 46 with the softer outer fiber batt 200 or 300 on top so that when the web structure enters housing 30 the firm core fiber batt contacts drum 40. Relatively high vacuum and high temperature in drum 40 effectively melts the low melting temperature binder fibers as heated air passes through each of the firmer and softer fiber batts 100 and 200 or 300. As the web structure passes from drum 40 to drum 42, the top, softer side passes into contact with drum 42 which operates at a somewhat lower vacuum and at a somewhat lower temperature. The lower temperature and vacuum pressure in the area of drum 42 are sufficient to complete the melting of the low melt fibers and bind the fiber web structure into a compressed batt which would retain its thickness when cooled.

Figure 6B:
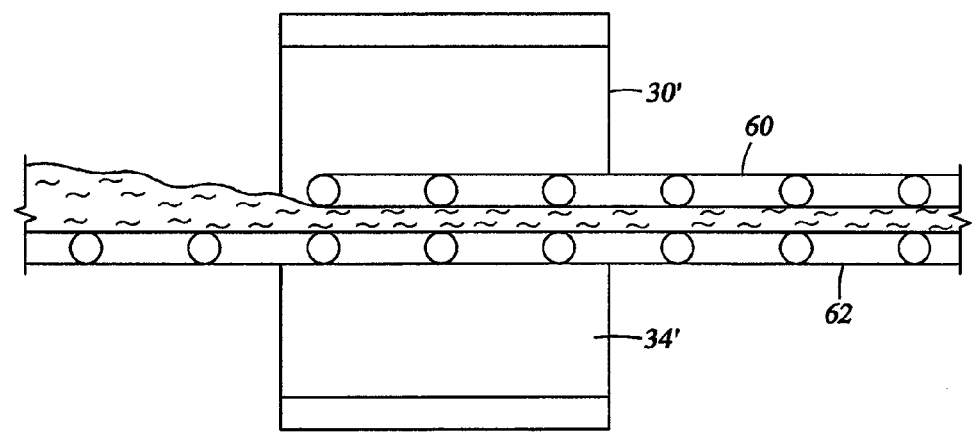

Referring to FIG. 6B, in an alternative thermal bonding process, the fiber web structure enters housing 30' by a pair of substantially parallel perforated or mesh wire aprons 60, 62. Housing 30' comprises an oven 34' which heats the fiber web structure to soften or melt the relatively low melting temperature binder fibers in the web structure to the extent necessary to fuse adjacent low melting temperature binder fibers together and to adjacent carrier fibers.

Referring to FIGS. 5, 6A and 6B, the fiber web structure is compressed and cooled as it exits from housing 30, 30' by a pair of substantially parallel first and second perforated or wire mesh aprons 70, 72. Aprons 70, 72 are mounted for parallel movement relative to each other to facilitate adjustment for a wide range of fiber web structure thicknesses (not shown). The fiber web structure can be cooled slowly through exposure to ambient temperature air or, alternatively, ambient temperature air can be forced through the perforations of one apron, through the fiber web structure and through the perforations of the other apron to cool the fiber web structure and set it in its compressed state to form a fiber batt. The fiber batt is maintained in its compressed form upon cooling since the solidification of the low melt temperature binder fibers in their compressed state bonds the fibers together in that state. The cooled fiber batt moves into cutting zone 80 where its lateral edges are trimmed to a finished width and cut transversely to the desired length of fiber batt.

Referring to FIG. 4A, the web for each fiber batt 100, 200, 300 is thermally processed separately to form its batt. The batts 100, 200, 300 are overlaid, the fiber batt core 100 placed between the outer fiber batts 200, 300. The fiber batts 100, 200, 300 are bonded or laminated together to form the multi density fiber seat back 400. The bonding can be achieved by the heating, compressing and cooling processes described herein. Alternatively, the fiber batts can be bonded or laminated to form the multi density seat back 400. Bonding or lamination can be achieved with glue, adhesives, resins or other bonding agents which can be sprayed, painted or otherwise applied to the batts.

Referring to FIG. 4B, the webs for fiber batt core 100 and an outer fiber batt 200 or 300 are overlaid for simultaneous thermal processing to form a batt structure having fiber batt core 100 and an outer fiber batt 200 or 300. The combined batt structure can be overlaid with a similar structure, the fiber batt cores 100 facing one another, for bonding or lamination therebetween to form a multi density fiber seat back 400 having a fiber batt core 100 and outer fiber batts 200, 300. For example, a length of a combined fiber batt structure comprising a fiber batt care 100 simultaneously processed with and bonded to outer fiber batt 200 or 300 could be folded or cut along width and the fiber batts core placed proximate one another to form the multi density fiber seat back 400. The fiber batt cores could be bonded or laminated together as discussed herein. The resulting configuration would be outer relatively low density fiber batts 200, 300 and a core of relatively high density fiber batt 100 having a thickness of the combined thicknesses of the two fiber batt cores. Alternatively, the combined batt structure of fiber batt core 100 and an outer fiber batt 200 or 300 could be overlaid with another fiber batt 300 or 200, the fiber batt core 100 positioned between the outer fiber batts 200, 300 and bonded.

Figure 7:
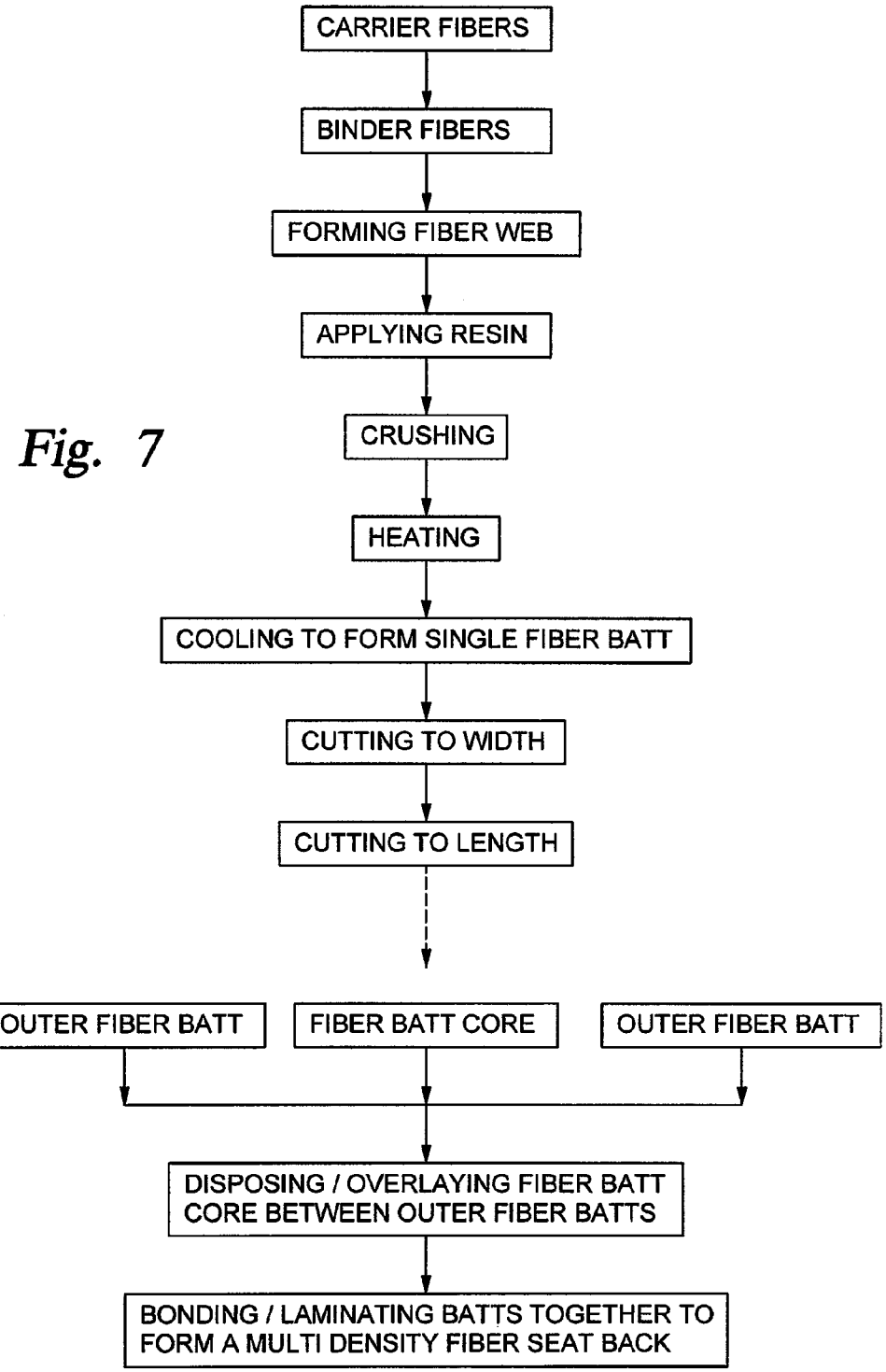
FIG. 7 provides a schematic illustration reflecting another process for producing fiber batts for a multi density fiber seat back.

Referring to FIG. 7, an alternative method for bonding the blended fibers of a fiber web comprises a resin bonding process which is representatively and schematically illustrated. Carrier fibers are blended to form a fiber web for each of fiber batt 100, 200, 300. The carrier fibers can be the same as or similar to those blended with the binder fibers in the thermal bonding process for a fiber batt. Low melt binder fibers are not required, as a heat curable binder material is used in the resin bonding process. Forming the fiber web of the resin bonding method is generally similar to that for the thermal bonding process detailed above. An air laying machine can also be used. In an air laying application, the carrier fibers are introduced into an air stream which carries the fibers to an air permeable support such as a perforated drum which is rotating. Accumulation of the fibers onto the drum surface results in a web formation. A vacuum is applied through the web from one side of the web to the other and through said air permeable support sufficient to reduce the thickness and increase the density of the web throughout the thickness of the web.

Heat curable resin is applied to the fiber web for bonding adjacent fibers together. While there are a variety of applications, generally resin in the form of liquid is sprayed while froth resin is extruded onto the fiber web. Alternatively, the fiber web is fed or dipped into a bath of resin. Resins suitable for the present invention are curable by heat and can be any of a variety of compositions. Generally, the resin is comprised of latex or acrylic binders. In the application of liquid resin, as the fiber web moves along a conveyor in the machine direction, the resin is sprayed onto the fiber web from one or more spray heads which move in a transverse or cross direction to substantially coat the fiber web. Froth resin is extruded onto the fiber web using a knife or other means. The fiber web could also be fed through or dipped into a resin bath. The applied resin is crushed into the fiber web for saturation therethrough by nip rollers which are disposed along the transverse direction of the conveyor to apply pressure to the surface of the fiber web. Alternatively, the resin is crushed into the fiber web by vacuum pressure applied through the fiber web. The fiber web moves into an oven heated to a temperature which cures the resin to form the fiber batt. The fiber batt exits the oven and is cooled. The dimensions of the fiber batt are maintained substantially in their oven state upon cooling since the heat cures the resin which bonds the fibers of the fiber batt together in this state. The fiber batt moves into a cutting zone where its lateral edges are trimmed to a finished width and it is rolled and cut transversely to the desired length. Thereupon, a relatively high density fiber batt 100 is overlaid with or placed between fiber batts of relatively low density 200, 300 and the batts are bonded or laminated together as discussed herein to form the multi density fiber seat back 400.

While preferred embodiments and examples have been shown and described, various modifications and substitutions may be made thereto without departing from the spirit and scope of the invention. Those skilled in the art will readily see other embodiments within the scope of the invention. Accordingly it is to be understood that the multi density fiber seat back of the present invention has been described by way of illustration only and not by way of limitation.

What is claimed is:

1. A multi density fiber seat back for furniture, comprising:
   a first and a second outer fiber batt of relatively low density; and
   a core of relatively high density fiber batt which is bonded between said first and said second outer fiber batts to form the multi density fiber seat back, wherein one of said outer fiber batts is placed against the seat back Fame of the furniture and the other outer fiber batt faces the seating area of the furniture;
   wherein said fiber batt core and said outer fiber batts are covered with upholstery to provide a decorative multi density fiber seat back;
   wherein the fiber batts are resiliently compressible, said outer fiber batt facing the seating area of the furniture providing a soft feel to the touch and said core fiber batt providing back support to one seated on the furniture and vertical stability to the multi density fiber seat back; and
   wherein the ratio of softness to firmness of the multi density fiber seat back is approximately 2 to 1.

2. The multi density fiber seat back of claim 1 wherein said fiber batts comprise binder fibers having a relatively low melting temperature and carrier fibers having a relatively high melting temperature, said core fiber batt comprises a higher percentage of binder fibers than the percentage of binder fibers in said first and second outer fiber batts, said higher percentage of binder fibers providing a relatively high density core fiber batt.

3. Furniture using the multi density fiber seat back of claim 2.

4. Furniture using the multi-density fiber seat back of claim 1.

5. The multi density fiber seat back of claim 1 wherein the thickness of each of the fiber batts is approximately four inches.

6. A multi density fiber seat back for furniture comprising:
   a first and a second outer fiber batt of relatively low density, wherein each of said outer fiber batts is formed from a homogenous blend of fibers having a relatively low melting temperature and fibers having a relatively high melting temperature;
   a core of relatively high density fiber batt formed from a homogenous blend of fibers having a relatively low melting temperature and fibers having a relatively high melting temperature, wherein the homogeneous blend of fibers for said core fiber batt is of a different proportion or selection of fibers from the homogeneous blends of said outer fiber batts to provide the relatively higher density of said core fiber batt, wherein said core fiber batt is bonded between said first and said second outer fiber batts to form the multi density fiber seat back;
   wherein one of said outer fiber batts is placed against the seat back frame of the furniture and the other outer fiber batt faces the seating area of the furniture;
   wherein the fiber batts are resiliently compressible, said outer fiber batt facing the seating area of the furniture providing soft feel to the touch, said core fiber batt providing back support, and the other of said fiber batt against the seat back frame of the furniture providing a sense of reclining, to one seated on the furniture; and
   wherein the ratio of softness to firmness of the multi density fiber seat back is approximately 2 to 1.

7. The multi density fiber seat back of claim 6 wherein said fiber batt core and said outer fiber batts are covered with upholstery to provide a decorative multi density fiber seat back.

8. Furniture using the multi density fiber seat back of claim 6.

9. The multi density fiber seat back of claim 6 having a thickness of approximately twelve inches.

10. The multi density fiber seat back of claim 6 wherein each of said fiber batts have a thickness of approximately four inches.

* * * * *